Oct. 9, 1951  D. O. DRUGE  2,570,655
PRESSURE GAUGE AND RELIEF VALVE
Filed Dec. 29, 1945
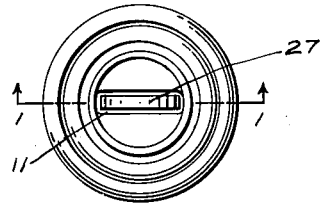
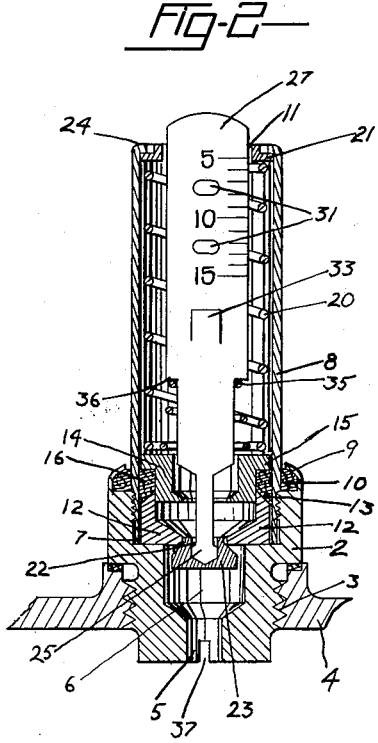
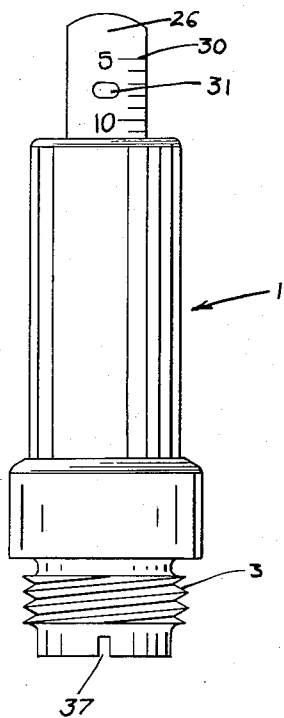
INVENTOR.
DANIEL O. DRUGE
BY
Boyken, Mohler & Beckley
ATTORNEYS Patented Oct. 9, 1951

2,570,655

UNITED STATES PATENT OFFICE 2,570,655

PRESSURE GAUGE AND RELIEF VALVE

Daniel O. Druge, Oakland, Calif.

Application December 29, 1945, Serial No. 638,283

1 Claim. (Cl. 137—53)

This invention relates to a pressure gauge and relief valve.

One of the objects of the invention is the provision of a combined pressure gauge and relief valve in a single, simple device that is rugged and reliable and economical to make.

Another object of the invention is the provision of a combined pressure gauge and automatic relief or safety valve that is adapted to be manually actuated for relieving the gas pressure in a container equipped with the valve. By the term "gas" is meant any elastic fluid, such as steam, etc.

Heretofore, particularly in household pressure cookers, it has been the custom to employ a dial type pressure gauge to register the pressure. In addition, a safety, relief or pop-off valve is provided for safety reasons. The dial is necessarily relatively small inasmuch as the cooker is small, and an accurate reading of the dial requires rather careful scrutiny. The use of the relief valve and separate pressure gauge requires two openings in the cooker or cover, doubling the chance for leakage and also doubling the time required for assembly. The cost of a separate dial gauge and safety valve obviously is far more than the cost of either of said devices alone. Furthermore, a separate gauge and safety valve means two projections on the cooker, whereas the ultimate desire is to make the cookers with the fewest exterior projections that is possible.

It is an object of this invention to overcome all of the above objectionable features heretofore present in most household pressure cookers, or other pressure devices where a gauge and safety valve is necessary. Other objects and advantages will appear in the description and in the drawings, one being provision in a single, combination safety valve and gauge for manually relieving the pressure in the cooker or receptacle.

In the drawings,

Fig. 1 is an elevational view of the combined gauge and safety valve, on the cover of a pressure cooker, only a fragment of said cover being indicated.

Fig. 2 is a sectional view taken longitudinally of the gauge and valve of Fig. 1, on line 2—2 of Fig. 3.

Fig. 3 is an end view.

In detail, the combined pressure gauge and relief valve comprises an elongated tubular body generally designated 1. A base 2 forming one end portion of said body is exteriorily threaded at 3 for screwing into a boss or opening in the receptacle or cover 4.

The said base is formed with an inlet 5 at the end that faces into the pressure cooker, which inlet opens at one end into said cooker and at the opposite end into a coaxial enlarged bore 6.

This bore 6 is counterbored at 7, the said counterbore being interiorly threaded for threadedly engaging one end of a barrel 8 that projects from the counterbore axially thereof and that forms the remainder of body 1.

The base 2 is preferably formed with a relatively thin annular flange 9 that is coaxial with counterbore 7, but that is spaced from the barrel 8. Packing 10 is positioned between the barrel and the said flange, and the latter may then be crimped over toward the barrel forming an absolutely tight seal between the base and the barrel irrespective of whether the barrel is tightened in the counterbore.

The barrel 8 is cylindrical with smooth inner sides for supporting a piston for reciprocation. Also barrel 8 has an open outer end, therefore the base 2 and barrel 8 combine to form body 1 which has a through open-ended passageway therein, the inlet to said passageway being inlet 5 and the outlet being the opening 11 in the outer end of or barrel 8.

The piston is in the portion of the passageway that is in barrel 8, and said piston is preferably made up of four elements, one being a cylindrical inner element 12. The term "inner" refers to the relative proximity to the inlet 5; the inner element of a pair would be the one closer to the inlet than the other or "outer" element.

The said inner element is freely slidable in barrel 8 and its axially outwardly facing outer edges (relative to said inlet) are beveled as at 13 to provide a slanted outer edge facing generally radially outwardly with respect to the axis of the element 12.

An outer cylindrical element 14 coaxial with inner element 12 is slidable within the element 12, and said outer element 14 is formed with annular, radially outwardly projecting flange 15 that extends over the slanted outer edge 13 of element 12 to substantially the barrel 8.

Between the flange 15 and said outer edges 13 of the inner member 12 is a resilient, expansible, packing element 16. Upon squeezing the said packing, as by forcing the inner and outer elements toward each other, the packing 16 will be forced radially outwardly against barrel 8 to provide a tight gas seal between the piston and the barrel. This pressure or expansion is caused by a coil spring 20 that reacts between the flange 15 of the outer element in the piston and a swivel washer 21 that is secured in the outer open end of the barrel 8, and in which swivel washer the outlet 11 is formed. The outer edges 24 of barrel 8 are rolled radially inwardly to retain the swivel washer in the barrel.

The inner element 12 of the piston is centrally apertured to provide a central passageway or port 22, and which port is normally closed by a valve element 23 that seats against the edge of said port that is adjacent the inlet. Thus any steam or gas pressure in the cooker and in enlarged portion 6 of the bore in the body 1 will tend to urge the valve 23 to closed position. The valve 23 therefore, is seen to be part of the piston itself, and upon sufficient pressure being in the cooker and acting upon the piston through inlet 5, the entire piston will move as a body toward outlet 11 against the resistance of spring 20.

The side of the valve 23 that is in the port 22 and that faces toward the outlet 11 is formed with an axially directed socket opening toward said outlet, and in which socket is swivelly and rotatably received one end portion 25 of a gauge member 26 that may be in the form of a flat bar 27, or square or cylindrical in cross-section, as desired.

The said gauge member 26 freely extends through a central opening in the outer element 14 of the piston and through the outlet 11. When the inner element 12 of the piston is seated against the base of the counterbore 7, the outer end of the gauge member will project slightly outwardly of the outer end of the barrel 8 as indicated in the drawings, but as the gas pressure against the piston increases the gauge member will be moved progressively outwardly of said barrel and outlet 11 distances in direct proportion to the pressure.

Outlet 11 in swivel washer 24 may be of an outline corresponding to the cross-sectional contour of the gauge member 26, but of larger dimensions so as to provide a space between the edges of the outlet and the gauge member for free escape of gas or steam, etc.

This gauge member is marked on one or both of its flat sides with spaced graduations 30 that are identified by numerals, such as "5," "10," "15" in succession in direction from the outer end of the member toward the inlet, and which graduations and numerals are arranged to indicate the gas pressure that is required to move the member 26 outwardly for exposing the said graduations for reading when they are even with the outer side of the swivel washer. If there is a 10 lb. pressure, for example, the graduation identified by the numeral "10" will just be readable at the end of the barrel 8. If a 15 lb. pressure, the graduation "15" will be exposed. Intermediate graduations may be used to indicate the pressures between those shown.

For quick reference by the housewife, the gauge member 26 is formed with a pair of openings 31, one opening being positioned midway between graduations identified by the large numerals "5" and "10," and the other opening being formed midway between the large numerals "10" and "15." Thus if one opening appears in the gauge member beyond barrel 8, the housewife immediately knows that the pressure in the cooker is at least 7 or 7½ lbs., while if two openings appear, then the pressure is at least 12 or 12½ lbs.

Struck laterally from gauge member 26 between the numeral "15" and the piston is a piece 33 that projects from the side of the member at a point that would be about even with a graduation line that would indicate an 18 lb. pressure. This piece 33 will engage the swivel collar 24 if the pressure in the cooker goes to 18 lbs., and if the pressure goes beyond 18 lbs., then the inner and outer elements 12, 14 will continue to move toward the outer end of the barrel, but the valve 23 will be held stationary due to the fact that the piece 33 holds the same from further outward movement. This will result in the port 22 being opened to relieve the pressure.

The end portion 25 of the gauge member is secured in the socket in valve 23 so that movement of the piston away from the outlet will cause the said member to be carried with the piston and valve from extended position of said member to the position seen in Figs. 1, 2.

The user of the cooker may readily deflate the pressure cooker by placing a spoon or other implement on the projecting end of the gauge member and forcing the valve away from its seat for opening the port. A relatively light spring 35 reacting between the outer element 14 of the piston and a shoulder 36 on the gauge member acts to yieldably return the valve 23 to closed position upon release of any pressure on the bar for deflating the cooker or for relieving the pressure.

The seating of valve 23 is assured by reason of the swivel and rotative connection between the gauge member and the valve.

In order to enhance the appearance of the combination gauge and valve, and to facilitate its securement to the cooker, the inner end of the base adjacent the inlet may be cross-grooved as at 37 for turning the valve by any instrument adapted to enter the groove. Thus no unsightly nuts appear on the outside of the cooker, and there is no possibility of nicking or mutilitating the finish by use of a wrench, or the like.

In referring to the pounds of pressure for moving the gauge member and for opening valve 23, it is to be understood that the invention is not limited to such arrangement. The tension of the spring 20 and the area of the piston exposed to the gas pressure determines the degree of pressure required for moving the piston and gauge member a certain distance and what that distance is. The use of a lighter spring would enable the measuring of lower pressures with accuracy, and the use of a heavier spring would be more suitable for higher pressures without making the device too bulky.

I claim:

A combined pressure gauge and relief valve comprising a body formed with an open-ended through passageway, one open end being an inlet for gas under pressure and the other end being an outlet for said gas, means interposed between said inlet and said outlet responsive to the pressure of gas adapted to enter said inlet for progressive movement toward said outlet in direct proportion to such pressure, said means including a passageway communicating between said inlet and said outlet, a normally closed relief valve in said last mentioned passageway closing it and movable to a position opening the latter, a gauge member extending through said outlet and connected with said means for movement therewith and visible outside said body at said outlet for visually indicating the degree of said movement, and means carried by said gauge member within said body engageable with said body at said outlet for causing said valve to open at a predetermined point in said movement.

DANIEL O. DRUGE.

REFERENCES CITED

The following references are of record in the file of this patent:

UNITED STATES PATENTS

| Number | Name | Date |
|---|---|---|
| 1,167,919 | Nathan | Jan. 11, 1916 |
| 1,223,252 | Branz | Apr. 17, 1917 |
| 1,523,986 | Schmidt | Jan. 20, 1925 |
| 1,552,760 | Rothenbucher | Sept. 8, 1925 |
| 1,563,847 | Hall | Dec. 1, 1925 |
| 2,998,420 | Carliss | Apr. 16, 1935 |
| 2,013,372 | Work | Sept. 3, 1935 |